A. MÜLERTZ.
APPARATUS FOR STERILIZATION OR PASTEURIZATION OF LIQUIDS.
APPLICATION FILED AUG. 23, 1919.
1,396,520.
Patented Nov. 8, 1921.
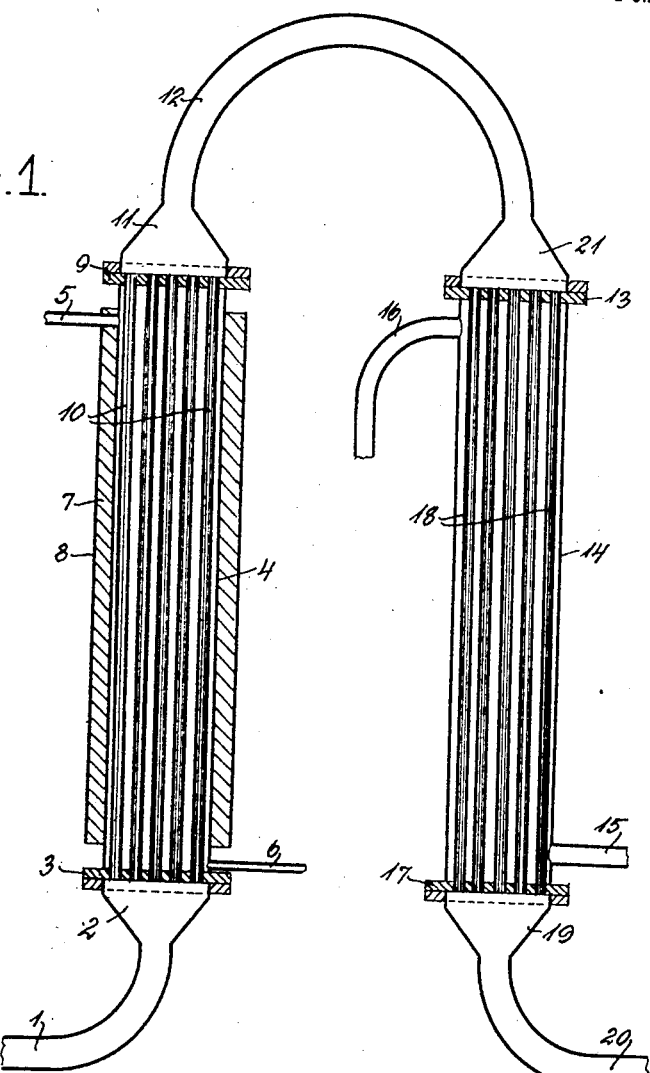
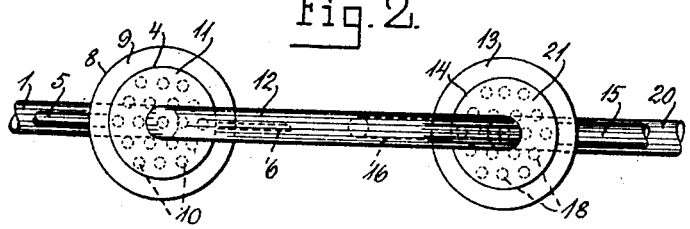
INVENTOR:
André Mülertz
By Wm Wallace White
ATTY.

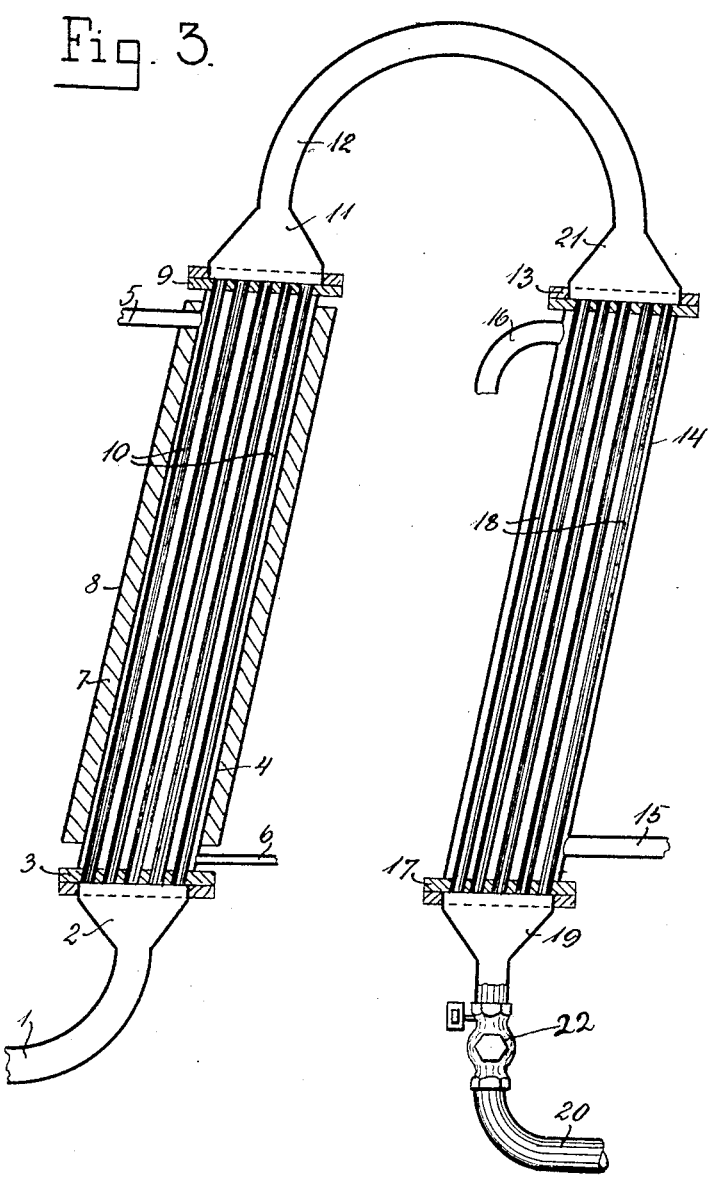

UNITED STATES PATENT OFFICE.

ANDRÉ MÜLERTZ, OF COPENHAGEN, DENMARK.

APPARATUS FOR STERILIZATION OR PASTEURIZATION OF LIQUIDS.

1,396,520.   Specification of Letters Patent.   Patented Nov. 8, 1921.

Application filed August 23, 1919. Serial No. 319,491.

*To all whom it may concern:*

Be it known that I, ANDRÉ MÜLERTZ, a subject of the King of Denmark, residing at Copenhagen, in the Kingdom of Denmark, have invented new and useful Improvements in Apparatus for Sterilization or Pasteurization of Liquids, of which the following is a specification.

Various liquids, for instance milk, are deteriorated by being conveyed, at high speed and high pressure through tubes comparatively of small diameter. This drawback has manifested itself especially by the sterilization or pasteurization of such liquids, when the liquid is conveyed through horizontal tubes bent in zigzag manner, there appearing in these bends partly an excessively great resistance against the flow, and partly drawbacks due to the liquid striking the bends with a shock. In order to attain an efficient uniform heating and cooling, the tubes must be of small diameter, as tubes of large diameter would have the effect that only the outer layer of the liquid would be efficiently heated or cooled, while the inner layers would only to a very slight extent be exposed to the heating or cooling action. It has been tried to use such apparatuses especially for sterilization of liquids such as milk and cream at a temperature of for instance 130° C.

The above mentioned drawbacks are avoided by the present invention, which relates to an apparatus for sterilization or pasteurization of liquids by which apparatus the liquid under pressure, during the heating as well as the cooling process, is conveyed through tubes of the required small diameter at a relatively slow speed, so that sterilization or pasteurization may be effected in thoroughly efficient and satisfactory manner at a temperature of for instance 130° C.

The result is attained by conveying the liquid in the apparatus according to the counter-stream principle during heating as well as during cooling, through systems of vertical or inclined tubes at such a rate of speed that the liquid is exposed to the highest and lowest temperature for only the shortest possible time, after having previously been heated gradually, and then again gradually cooled.

The apparatus is arranged in such a manner that the liquid, during the sterilization or the pasteurization, does not at any moment come into contact with the outer air, but leaves the apparatus in absolutely sterilized or pasteurized state.

The capacity of the apparatus is determined in advance by the number of tubes in the tube-systems.

The apparatus is illustrated on the drawing, where—

Figure 1 shows a vertical section of the apparatus with vertical heating and cooling-tubes.

Fig. 2 the same in top-view, and

Fig. 3 a vertical section of the apparatus with the heating and cooling-tubes disposed obliquely.

1 is the supply tube for the liquid which is pumped into the tube by means of a pump not shown on the drawing. The tube 1 has, at its upper end, a funnel-shaped extension 2, which is fastened to the bottom 3 of a receiver 4 fitted with supply and discharge-tubes 5 and 6, respectively, for the heating medium which may, for instance, be steam. The receiver 4 is covered, on the outside, with an insulating material 7 inclosed in a metal casing 8. The receiver 4 is closed, at top, by a cover 9. In the latter and in the bottom 3, there are holes for small tubes 10 communicating, at top, with a funnel-shaped extension 11 of a tube 12, whose opposite funnel-shaped end 21 is connected to the cover 13 of a receiver, 14. This receiver is fitted with supply and discharge-pipes 15 and 16, respectively, for the cooling medium which may, for instance, be cold water. In the cover 13 and in the bottom 17 of the receiver 14, there are holes for narrow tubes 18 whose lower ends communicate with a funnel-shaped extension 19 on a discharge tube 20 for the sterilized liquid, the said tube being connected to the bottom 17.

The apparatus acts in the following manner:

By means of a pump, the liquid to be sterilized or pasteurized is forced into the tube 1 and up into the extension 2 thereof, from whence it ascends through the tubes 10 at a rate of speed corresponding to the time required for the sterilization of the liquid being treated for instance about one inch per second.

During the upward motion through the tubes 10, the liquid is acted on first at the bottom of the receiver 4 by the water condensed from the steam which is introduced, by way of the tube 5, into said receiver 4, and, during the further passage upward, the liquid is heated gradually until, at the top of the receiver 4 it is heated, by the steam flowing into the receiver, to the actual sterilizing or pasteurizing temperature. The liquid passes then, by way of the connecting tube 12, into the cooling vessel 14, it being distributed, in the extension 21, to all the tubes 18 in the receiver 14. The temperature of the liquid is here gradually reduced, the liquid being cooled slightly by the heated water ascending along the outside of the tubes 18 until, before it leaves the lower ends of the tubes 18, the liquid is actuated by the cold water entering through the tube 15. By way of the tube 20, the sterilized or pasteurized liquid flows to a closed and disinfected tank, which is not shown on the drawing.

In order to prevent the liquid from being caused by the heat to boil in the apparatus, there is provided, in the discharge tube 20, a counter-pressure valve 22 (Fig. 3) and the loading of this valve is adjusted in such a manner that it will be able to exert a counter-pressure exceeding the pressure which may be produced in the apparatus by the generation of steam at a certain temperature, when counter-pressure is present.

In the construction of the apparatus shown by way of example, the receivers 4 and 14 with the tubes 10 and 18 provided therein are shown to be vertical. There is obviously nothing to prevent the receivers and the tubes from being disposed in inclined position.

Having thus described my invention, what I claim is:—

1. An apparatus for sterilizing liquids, comprising a set of vertical heating tubes and a set of vertical cooling tubes disposed in parallel relation, the heating tubes having an inlet at their lower ends and an outlet at their upper ends, the cooling tubes having an inlet at their upper ends and an outlet at their lower ends, means for supplying heating and cooling media to the exterior of the heating and cooling tubes respectively adjacent their outlet ends and means for permitting the escape of said media adjacent the inlet ends of the tubes.

2. An apparatus for sterilizing liquids, comprising a set of vertical heating tubes having an inlet and an outlet at opposite ends thereof for causing the liquid to pass continuously in one direction, a set of vertical cooling tubes having an inlet and an outlet at opposite ends, the inlet of the cooling tubes being in communication with the outlet of the heating tubes, means adjacent to the outlet of the heating tubes for supplying a heating medium to the exterior of said tubes, means adjacent to the outlet of the cooling tubes for supplying a cooling medium to the exterior of said tubes, and a counter pressure valve in communication with the outlet from said cooling tubes for producing a pressure in the apparatus.

In testimony whereof I have signed my name to this specification.

ANDRÉ MÜLERTZ.

Witnesses:
 V. BELSCHNER,
 E. W. ETESKOW.